Aug. 3, 1965 E. ASTROVE ETAL 3,199,089

PERMANENT MAGNETIC STORAGE DEVICE

Filed April 10, 1961 3 Sheets-Sheet 1

INVENTOR.
EDGAR ASTROVE
ALBINO CASSELLA
ALAN L. GOLDMAN

BY H. A. Mackey

ATTORNEY.

PERMANENT MAGNETIC STORAGE DEVICE

Filed April 10, 1961 3 Sheets-Sheet 2

INVENTOR.
EDGAR ASTROVE
ALBINO CASSELLA
ALAN L. GOLDMAN

BY H. A. Mackey

ATTORNEY.

Aug. 3, 1965 E. ASTROVE ETAL 3,199,089

PERMANENT MAGNETIC STORAGE DEVICE

Filed April 10, 1961 3 Sheets-Sheet 3

INVENTOR.
EDGAR ASTROVE
ALBINO CASSELLA
ALAN L. GOLDMAN

BY

ATTORNEY.

United States Patent Office 3,199,089
Patented Aug. 3, 1965

3,199,089
PERMANENT MAGNETIC STORAGE DEVICE
Edgar Astrove, Scarsdale, Albino Cassella, Bronx, and Alan L. Goldman, Yonkers, N.Y., assignors to General Precision, Inc., a corporation of Delaware
Filed Apr. 10, 1961, Ser. No. 101,794
20 Claims. (Cl. 340—174)

This invention relates to binary coded digital computers, data processing and control circuits; and more particularly to a magnetic storage device, capable of a nondestructive readout, which is suitable for use in said circuits.

This invention is particularly suited for use in the Data Processing and Display System, described by David A. Goldman et al. in application Serial No. 57,776, filed September 22, 1960, as a direct substitution for the permanently coded storage device disclosed therein. When so used an improvement may be observed in both operation and versatility of the system.

One object of this invention is to provide a permanent magnetic storage device having nondestructive readout which has high signal-to-noise ratio.

Another object of this invention is to provide a storage unit as set forth above which is easily altered to provide a flexible coding system.

Yet another object is to provide a permanent magnetic storage system which will accept any binary code within its digit capabilities.

The invention contemplates a permanent magnetic storage unit with nondestructive readout comprising, a core of magnetic material having a plurality of windings thereon, said windings and core providing two substantially dissimilar magnetic circuits which share one common element, and bistable means magnetically coupled with one of said magnetic circuits to saturate a portion of said one circuit when in one of said states to render said magnetic circuits substantially similar.

The foregoing and other objects and advantages of the invention will appear more clearly from a consideration of the specification and drawings wherein one embodiment of the invention is described and shown in detail for illustration purposes only.

Figure 1:
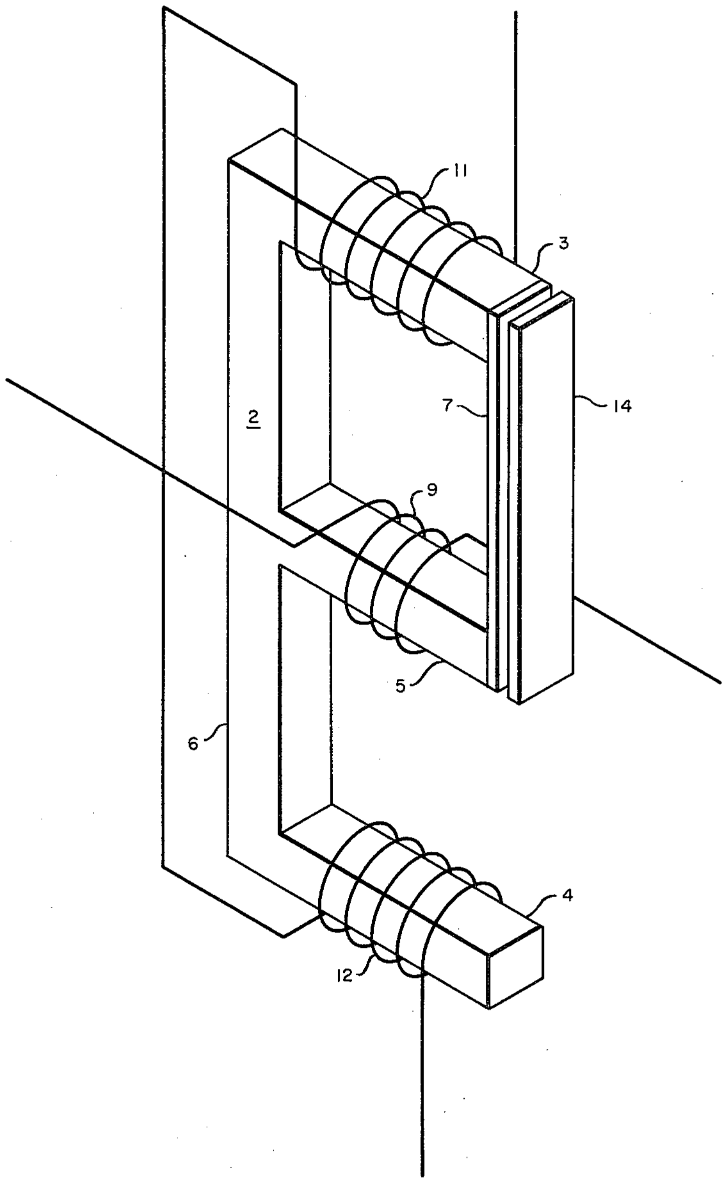
FIGURE 1 is an isometric drawing of a single storage unit constructed and arranged according to the invention.

In FIGURE 1 an E-shaped laminated core 2 has upper and lower extensions 3 and 4, respectively, and a central extension 5 projecting from a central portion 6. A member 7 of magnetic material having a high permeability such as Mumetal, which is particularly suited for this application, extends between the terminus of the upper extension 3 and the terminus of the central extension 5. Central extension 5 of core 2 has a winding 9 which is connected to a source not shown for energization and extensions 3 and 4 bear windings 11 and 12, respectively. Windings 11 and 12 are opposite in sense and are connected in series so that when a voltage or a pulse is applied to winding 9, voltages will be induced in windings, 11 and 12, which are opposed to each other and will, under circumstances to be described, cancel each other. A permanent magnet 14 is positioned adjacent to and contiguous with the Mumetal member 7 so that the lines of flux associated with the magnetic field of the permanent magnet 14 will saturate Mumetal member 7.

If the lines of flux threading Mumetal member 7 due to magnet 14 are in the same direction as the lines of flux induced when winding 9 is energized, the voltages induced in windings 11 and 12 will be equal and opposite and the unit will produce no output since the magnetic path which includes members 5, 7, 11 and 6, and the magnetic path which includes members 5, 6, 4 and the air gap between the ends of extensions 4 and 5, are substantially identical. These paths are rendered substantially identical since magnet 14 saturates member 7 and the lines of flux induced when winding 9 is pulsed cannot go through member 7 or magnet 14 and are thus forced to traverse the large air gap between the ends of extension 3 and 5 which is substantially identical to the large air gap between the ends of extensions 4 and 5.

However, when the lines of fluix threading Mumetal member 7 are opposed to the lines of flux induced when winding 9 is energized, the magnetic paths are dissimilar since the flux induced when winding 9 is pulsed will traverse member 7 and a greater voltage will be induced in winding 11 than in winding 12 to thus produce a useable ouput which indicates the orientation of permanent magnet 14 with respect to Mumetal member 7.

Figure 2:
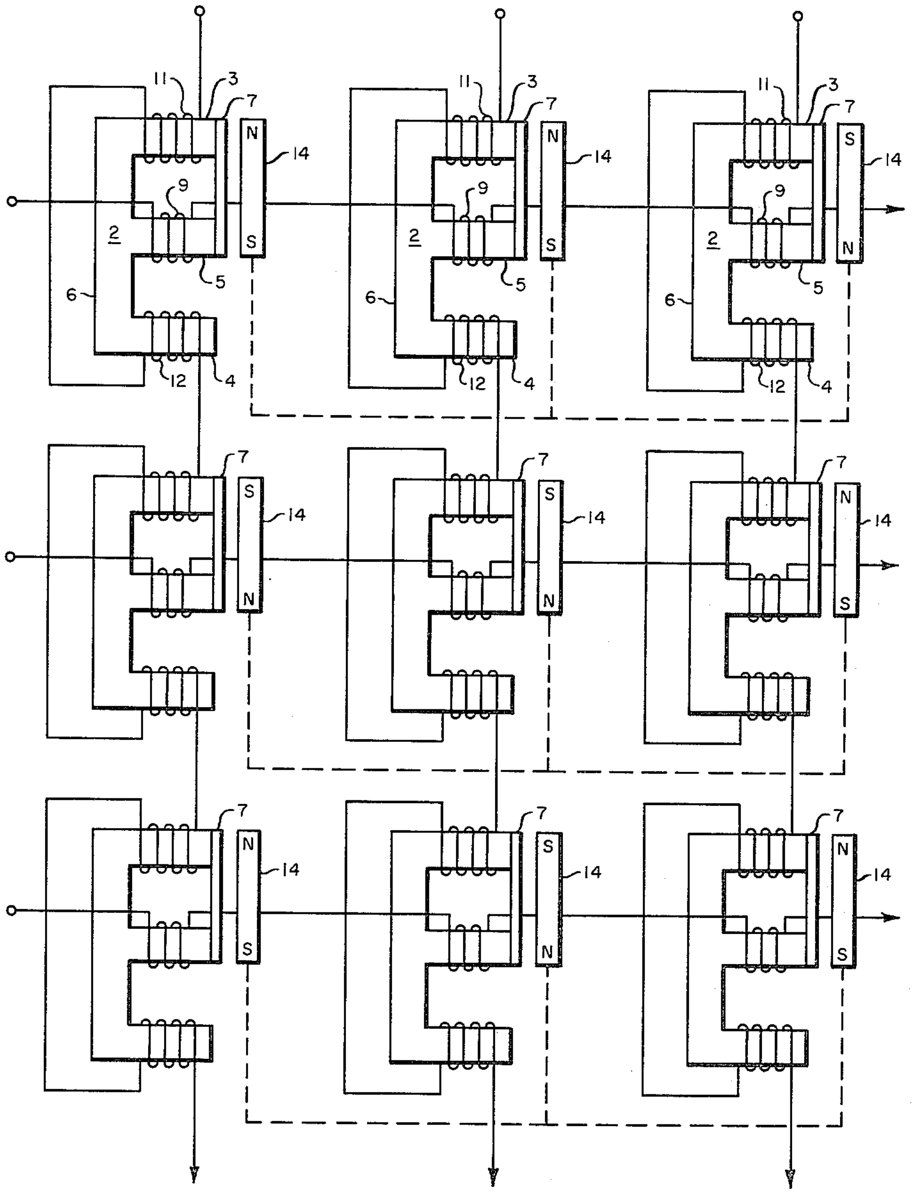
FIGURE 2 is a schematic diagram of a matrix comprising a plurality of individual units shown in FIGURE 1.

This basic unit may be arranged in a matrix such as that shown in FIGURE 2 wherein the windings 9 on the central extension 5 located in a row are connected in series and all windings 11 and 12 in each column are connected in series. The arrangement of the matrix is identical to that shown in the Goldman et al. application previously referred to. As the horizontal rows are successively pulsed, outputs will be provided in those columns wherein the permanent magnets 14 provide flux through member 7 which opposes the flux induced in member 7 by the pulsing of the winding 9.

Figure 3:
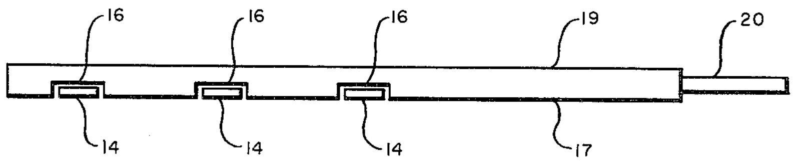
FIGURES 3 and 4 are an elevation and a plan view, respectively, showing one application of the invention useful in conjunction with the matrix of FIGURE 2.
Figure 4:
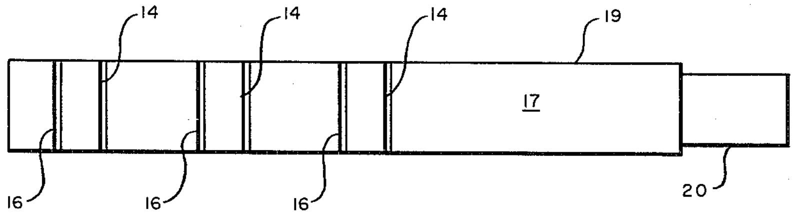

It should be noted that the permanent magnets 14 in each of the rows are fixed with respect to each other. This is indicated by the dashed lines interconnecting the magnets 14 in each of the rows. The arrangements of the magnets are shown in FIGURES 3 and 4 where the magnets 14 are shown inserted in channels 16 located in the bottom surface of the stationary member 17 of the holder 19. Movable portion 20 of the holder is shown displaced from its rest position.

The advantages of this arrangement over that shown in the Goldman et al. device fall into two distinct groups. This arrangement is by far more versatile than that employed by Goldman et al. since it permits a flexible coding system. That is, the code assigned to a given holder may be altered at any time so as to coincide with any fixed code that is desired. Thus, the computer employed with the Goldman et al. device would be relieved of the task of equating a fixed and invariable holder code to the code being processed.

The holder code may be altered either electrically or mechanically. If electrical alteration is desired, the direction of magnetization of any individual magnet may be selected by subjecting that magnet to a magnetic field which has great enough strength to reverse the magnet if it does not already have that direction. This may also be accomplished mechanically by physically reversing the magnet when it is so desired. In the Goldman et al. device mechanical alteration of the code is the only possibility and this would prove more difficult than the mechanical alteration contemplated in this invention since the Goldman et al. coding does not provide a coding element for zero but relies on the absence of a coding element to denote zero. In the device disclosed here, a bit whether it be zero or one, is coded not by the absence or presence of a coding element but by the direction of the magnetic field produced by the coding element. Thus, to change a bit from zero to one or vice versa requires only a physical reversal of the coding element. In the Goldman et al. device a similar change requires the removal or addition of a coding element and, thus, introduces additional operating complexities.

In addition to the above, the system here disclosed provides an increased output from each unit and a corresponding increase in signal-to-noise ratio since the air gap effect has been mitigated. The air gap between the Mumetal member 7 and the terminations of extensions 3 and 5 may be reduced to $\frac{1}{1000}$ of an inch versus an air gap of approximately $\frac{15}{1000}$ of an inch in the Goldman et al. device. It is true, however, that a $\frac{15}{1000}$ air gap will exist between permanent magnet 14 and Mumetal member 7, but this air gap is not critical nor will it degrade the performance since the field strength of permanent magnet 14 is more than adequate to saturate Mumetal member 7.

It has been determined that a magnet material such as Cunife is particularly suitable for use as the permanent magnet member While Cunife provides a magnetic field of lesser strength than alnico, it is, however, more easily reversed than alnico and, thus, a given holder may have its coding changed by merely electrically reversing the polarization of the permanent magnets. In those instances, where a physical reversal of the magnet 14 is possible, alnico would be a wiser choice since it would be capable of providing a stronger magnetic field for saturating member 7, and, thus, the air gap between the magnets and member 7 would be of even less significance. Alnico may also be used where electric reversal is contemplated, however, larger currents will be required to effect the reversal.

While only one embodiment of the invention has been shown and described in detail for illustration purposes only, it is to be expressly understood that the invention is not to be limited thereto.

What is claimed is:

1. A permanent magnetic storage unit with nondestructive readout comprising, a magnetic core having two substantially dissimilar magnetic circuits each of which share one common magnetic core element, and bistable means magnetically coupled to one of said magnetic circuits only for saturating a portion thereof when in one of said two states to render said magnetic circuits substantially similar.

2. A permanent magnetic storage unit with nondestructive readout comprising, a core of magnetic material having a plurality of elements, said core elements providing two substantially dissimilar magnetic circuits which share one common element, and bistable means magnetically coupled with one of said magnetic circuits to saturate a portion of said one circuit when in one of said two states to render said magnetic circuits substantially similar.

3. A permanent magnetic storage unit with nondestructive readout comprising, a core of magnetic material having at least three elements, said core elements providing two dissimilar magnetic circuits which share one common element, and active bistable magnetic means magnetically coupled with one of said magnetic circuits to saturate a portion of said circuit in a predetermined direction when the bistable magnetic means occupies a preselected state to render said magnetic circuits similar.

4. A permanent magnetic storgae unit as set forth in claim 3 in which said bistable magnetic means is a permanent magnet.

5. A permanent magnetic storage unit with nondestructive readout comprising, an E-shaped core of magnetic material, a shorting bar of high permeability magnetic material in engagement with one outside leg and the central leg of said E-shaped core to provide two dissimilar magnetic circuits each of which shares the center leg of said core, and active bistable magnetic means magnetically coupled with said shorting bar to saturate said bar when the bistable magnetic means occupies a preselected state to render said two magnetic circuits similar.

6. A permanent magnetic storage unit as set forth in claim 5 in which said bistable magnetic means is a permanent magnet.

7. A permanent magnetic storage unit with nondestructive readout comprising, a core of magnetic material having a plurality of windings thereon, said windings and core providing two substantially dissimilar magnetic circuits which share one common element, and bistable means magnetically coupled with one of said magnetic circuits to saturate a portion of said one circuit when in one of said two states to render said magnetic circuits substantially similar.

8. A permanent magnetic storage unit with nondestructive readout comprising, a core of magnetic material having at least three elements each with a winding thereon, said windings and core elements providing two dissimilar magnet circuits which share one common core element and its windings, and active bistable magnetic means magnetically coupled to one of said magnetic circuits for saturating a portion of said magnetic circuit in a predetermined direction when the bistable magnetic means occupies a preselected state to render said magnetic circuits similar.

9. A permanent magnetic storage unit as set forth in claim 8 in which said bistable means is a permanent magnet.

10. A permanent magnetic storage unit with nondestructive readout comprising, an E-shaped core of magnetic material having windings on each of the legs, the windings on said outside legs being opposite in sense and connected in series for connecting to a utilization device, a shorting bar of high permeability magnetic material in engagement with one outside leg and the central leg of said E-shaped core to provide two dissimilar magnetic circuits each of which shares the center leg of the E-shaped core, and active bistable magnetic means magnetically coupled with said shorting bar to saturate said bar in a predetermined direction when the bistable means occupies a preselected state to render said two magnetic circuits similar.

11. A permanent magnetic storage unit as set forth in claim 10 in which said bistable magnetic means is a permanent magnet.

12. A permanent magnetic storage system with nondestructive readout comprising, a plurality of cores of magnetic material arranged in a preset orientation, each of said cores having at least three elements which provide two dissimilar magnetic circuits sharing one common core element, an active bistable magnetic means arranged adjacent each of said cores to saturate a portion of one of said two magnetic circuits associated with each core in a predetermined direction when it occupies one preselected state to render the two circuits similar, and means for fixedly interconnecting all of said bistable magnetic means to form a single structure.

13. A permanent magnetic storage system as defined in claim 12 in which each of said bistable magnetic means is a permanent magnet.

14. A permanent magnetic storage system with nondestructive readout comprising, a plurality of E-shaped cores of magnetic material arranged in a preset orientation, each of said cores having a shorting bar of high permeability magnetic material in engagement with one outside leg and the central leg of said E-shaped core to provide two dissimilar magnetic circuits each of which shares the center leg of said core, an active bistable magnetic means arranged adjacent each of said shorting bars to saturate said bars in a predetermined direction when the bistable means associated with a given bar occupies one preselected state to render the two magnetic circuits similar, and means for interconnecting said bistable magnetic means to form a unitary structure.

15. A permanent magnetic storage system as set forth in claim 14 in which each of said bistable magnetic means is a permanent magnet.

16. A permanent magnetic storage system with nondestructive readout comprising, a plurality of cores of magnetic material each having at least three elements with windings thereon, each of said cores its associated windings and elements providing two dissimilar magnetic circuits which share one common core element and its associated winding, an active bistable magnetic means magnetically coupled with one element of each of said cores for saturating a portion of one of said magnetic circuits associated with each core in a predetermined direction when the bistable magnetic means occupies a preselected state to render the magnetic circuits in the associated core similar and means for interconnecting said bistable magnetic means to form a unitary structure.

17. A permanent magnetic storage system as set forth in claim 16 in which each of said bistable magnetic means is a permanent magnet.

18. A permanent magnetic storage system with nondestructive readout comprising a plurality of E-shaped cores of magnetic material each of which has windings on each of the legs, the windings on said outside legs of each core being opposite in sense and connected in series for connection to a utilization device, a shorting bar of high permeability magnetic material in engagement with one outside leg and the center leg of each of said E-shaped cores to provide two dissimilar magnetic circuits in each of said cores which share the leg of the E-shaped core, active bistable means magnetically coupled with each of said shorting bars to saturate its associated bar in a predetermined direction when the bistable means occupies a preselected state to render the two magnetic circuits in the associated core similar and means for interconnecting said bistable magnetic means to form a unitary structure.

19. A permanent magetic storage system as set forth in claim 18 in which each of said bistable magnetic means is a permanent magnet.

20. A permanent magnetic storage unit with nondestructive readout comprising, a magnetic core having two substantially dissimilar magnetic circuits each of which share one common magnetic core element, and bistable means located contiguous with one of said magnetic circuits only for providing an external magnetic field and magnetically coupled to said circuit for saturating a portion thereof to render both said magnetic circuits substantially similar when in one of said two stable states.

References Cited by the Examiner

UNITED STATES PATENTS

| | | | |
|---|---|---|---|
| 2,590,091 | 3/52 | Devol | 340—174.1 |
| 2,729,106 | 1/56 | Mathiesen | 340—174.1 |
| 2,730,664 | 1/56 | Karlson | 323—90 |
| 2,905,874 | 9/59 | Kelling | 340—347.3 |

IRVING L. SRAGOW, *Primary Examiner.*

JOHN F. BURNS, *Examiner.*